United States Patent Office 3,355,272
Patented Nov. 28, 1967

3,355,272
ABRASIVE COMPOSITIONS AND STRUCTURES THEREOF COMPRISING A THERMOSETTING RESIN AND A THERMOPLASTIC POLYARYLENE POLYETHER
William J. D'Alessandro, Old Bridge, N.J., assignor to Union Carbide Corporation, a corporation of New York
No Drawing. Filed Nov. 24, 1964, Ser. No. 413,620
18 Claims. (Cl. 51—298)

This invention relates to abrasive compositions and to improved abrasive structures thereof. More particularly, the invention relates to abrasive structures exhibiting improved flexural strength and toughness at both room temperatures and at elevated temperatures, and improved heat resistance.

Abrasive structures such as grinding wheels, snagging wheels and the like desirably have good flexural strength and toughness at room temperatures to prevent, for example, bursting apart due to centrifugal forces. A technique proposed for improving the toughness and flexural strength of abrasive structures has been the incorporation of thermoplastic materials such as polyvinyl acetals and other vinyl resin modifiers (polyvinyl chloride and vinyl chloride copolymers). In use, however, abrasive structures become quite hot. Addition of these materials, because of their notoriously poor thermal and dimensional stability at elevated temperatures, reduces to unacceptably low levels the strength of abrasive structures at their usual elevated use temperatures. Low limits on use temperature necessitate slow grinding speeds and are otherwise undesirable. Also, addition of these materials undesirably reduces the heat resistance of the abrasive structures.

It is an object, therefore, of the present invention to provide abrasive compositions.

It is another object to provide abrasive structures wherein room temperatures and elevated temperature flexural strength and toughness and heat resistance are improved.

It is another object to provide method for improving the room temperature and elevated temperature flexural strength and toughness of abrasive structures.

These and other objects of this invention are accomplished by providing abrasive compositions comprising abrasive grains and a binder therefor comprising a heat hardenable resin and a thermoplastic polyarylene polyether, described in detail below, and abrasive structures molded from the compositions. The improved abrasive structures of this invention are characterized by superior heat resistance which results in greatly improved efficiency for the structures, an ability to absorb more punishment in use, and greatly improved room temperatures and elevated temperature strength as compared to conventional abrasive structures.

Quite surprisingly, the thermoplastic polyarylene polyether rather than detracting from the high use temperature properties of abrasive structures as do other thermoplastic additives, actually improves heat resistance, flexural strength and toughness at 260° C. and higher.

Thermoplastic polyarylene polyethers used in the present invention are the linear thermoplastic polymers having a basic structure composed of recurring units having the formula:

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4-hydroxyphenyl)-2-phenylethane, bis-(4-hydroxyphenyl) methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl

sulfide (—S—), sulfone

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

$$HO(Ar-R-Ar)OH$$
$$(Y)_r \quad (Y_1)_z$$

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as

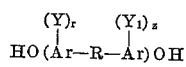

—O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane, 2,4'-dihydroxydiphenyl-methane, bis-(2-hydroxyphenyl)methane, bis-(4-hydroxyphenyl)-methane, bis - (4-hydroxy-2,6-dimethyl-3-methoxyphenyl)methane, 1,1-bis - (4-hydroxyphenyl)ethane, 1,2-bis-(4-hydroxyphenyl)ethane, 1,1-bis-(4-hydroxy-2-chlorophenyl)ethane, 1,1 - bis-(3-methyl-4-hydroxyphenyl)propane, 1,3-bis - (3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis - (4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenylpropane, 2,2-bis-(4-hydroxyphenyl) - 1,1,1,3,3,3-hexafluoropropane and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl)ether, bis - (4-hydroxy-3-chlorophenyl)ether, bis-(4-hydroxy-3-fluorophenyl)ether, bis - (4-hydroxy-3-bromophenyl)ether, bis-(4-hydroxynaphthyl)ether, bis-(4-hydroxy-3-chloronaphthyl)ether, 4,4' - dihydroxy-3,6-dimethoxydiphenyl ether, 4,4' - dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group

bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent group which can activate displacement of halogens on two different rings, such as the sulfone group

the carbonyl group

the vinyl group

the sulfoxide group

the azo-group —N=N—; the saturated fluorocarbon groups —CF$_2$CF$_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

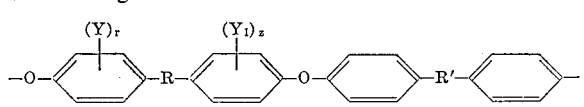

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substitutent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the theromplastic polyarylene polyethers of the above formula wherein $r$ and $z$ are zero, R is divalent connecting radical

wherein R″ represents a member of the group consisting of hydrogen, lower alkyl, lower aryl, and the halogen substituted groups thereof, and R′ is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substatntially anhydrous conditions. Any alkali metal salt of the dihydric phenol can be used as the one reactant.

The specific solvents employed have the formula

wherein each R represents a monovalent lower hydrocarbon group free of aliphatic unsaturation on the alpha carbon atom, and preferably contains less than about 8 carbon atoms or when connected together represents a divalent alkylene group with $z$ being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymeriztion reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sufone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsul-foxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C., are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplostic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

As stated previously, the abrasive compositions of this invention comprise abrasive grains and a binder therefor comprising a heat hardenable resin and a thermoplastic polyarylene polyether. If desired, other well known conventional additives and modifiers, such as heat resistant fillers, wetting agents, dehydrating agents and the like can be present in the compositions.

The phrases "abrasive compositions" and "abrasive structures" as used herein and in the appended claims are intended to be descriptive of that class of compositions and structures used to cut, wear off, or rub down objects, especially metals, in order to give them a desired size, shape, or finish. For this reason, abrasive grains used in this invention should be at least as hard as the material to be worked on by the abrasive compositions and structures.

Suitable abrasive grains are those conventionally employed in abrasive compositions such as aluminum oxide, silicon carbide, boron carbide, corundum, garnet, emery, mixtures thereof, and the like. Suitable abrasive grains have a hardness of from 1–10 on the Mohs scale and a grit size of from 4 to 240 mesh graded by the U.S. Bureau of Standards.

Suitable heat resistant, inorganic fillers are those commonly employed in abrasive compositions such as cryolite, fluorospar, iron pyrites, magnesium oxide, silica and the like. Fillers are generally used in finely divided form such as those ground so that 99% will pass through a 200 mesh screen.

The thermoplastic polyarylene polyether can contain one or more fillers, opacifiers, extenders, colorants or other additives conventional in thermoplastic technology and well-known to those in the art. These compositions can be prepared by any of the blending or mixing means conventionally used to mix or compound thermoplastics.

Heat hardenable resins which can be improved in heat resistance, room temperature and elevated temperature strength by the incorporation of thermoplastic polyarylene polyether are those resins generally employed in abrasive structures. Typical heat hardenable resins are phenol-aldehyde, amine-aldehyde and modified, e.g., amine modified phenol-aldehyde resins. Both novolaks and resoles are useful herein, the former in combination with hardeners. A full description of useful resins is given in the book entitled "The Chemistry of Phenolic Resins" by Rober W. Martin published in 1956 by John Wiley & Sons and also the book entitled "Phenoplasts" by T. S. Carswell published in 1947 by Interscience Publishers. These and other heat-hardenable resins are disclosed in U.S.P. 2,559,664 to Ries et al., U.S.P. 2,779,668 to Daniels et al. and U.S.P. 2,521,911 to Greenlee et al.

The term "phenol-aldehyde resin" herein refers to acid or base catalyzed thermosetting resins of the resole or novolak type prepared from a phenol such as phenol, cresol, xylenol, p-t-butylphenol, p-phenylphenol, bis-phenols and resorcinol and an aldehyde such as formaldehyde and furfural, such as described in U.S.P. 2,585,196 to Walton; U.S.P. 2,475,587 to Bender et al.; U.S.P. 2,557,922 to Mazzucchelli et al.; U.S.P. 2,617,785 to Pritchett et al.; U.S.P. 2,675,335 to Ranking et al. and U.S.P. 2,552,025 to Barr et al.

The aforementioned publications and patents are incorporated herein by reference.

In general, the abrasive compositions and structures of this invention contain a major amount of abrasive grains and a binding amount of a binder, that is, in an amount sufficient to bind the grains depending on the particular abrasive use intended for the structure. Abrasive grains are conventionally employed in amounts of from about 70% to about 95%, preferably from about 75% to about 90%, by weight based on the weight of the composition. A binding amount of binder will generally fall within the range of from about 1% to about 20%, preferably from about 8% to about 15% by weight based on the weight of the composition. When it is desired to employ fillers, they are generally employed in amounts of from about 5% to about 20%, preferably from about 5% to about 15% by weight based on the weight of the composition.

For purposes of the present invention, a binder comprising a heat hardenable resin and from about 1% to about 50%, preferably from about 5% to about 20% by weight, based on the weight of the resin of thermoplastic polyarylene polyether is suitable for producing the abrasive compositions and structures having the improved properties described herein.

The abrasive compositions of this invention can be prepared and abrasive structures molded therefrom by techniques commonly employed in the art to attain such ends. Suitable specific techniques are described in detail in the examples. In general, it can be stated that in order to obtain complete and adequate bonding, the abrasive grains, and binder therefor, and filler if desired, are mixed and/or molded under conditions which allow for complete and thorough wetting of the abrasive grains by the binder. Wetting can be accomplished by fluxing (flow under heat and usually pressure) the binder while in contact with the abrasive grains, by mixing a solution of the binder in a suitable solvent with the abrasive grains and by like and equivalent methods.

A suitable method for preparing the abrasive compositions of this invention comprises coating abrasive grains with a wetting agent such as a liquid, heat-hardenable resin or a resin solvent such as furfural, furfuryl alcohol, acetone, cresol and the like. A powdered heat hardenable resin previously mixed with a suitable hardener and thermoplastic polyarylene polyether is then mixed with the abrasive grains until a free flowing mixture is obtained. Molding and curing of the abrasive structure is then carried out by conventional techniques such as compression molding.

Two suitable methods for preparing the binder used in this invention are a hot melt process and a dry process.

In the hot melt process, thermoplastic polyarylene polyether in solid form, preferable in solid particulate form, is dissolved in a molten heat-hardenable resin. In the case of novolak resins, this is carried out at 150–170° C. The modified molten resin is then cooled, mixed with a hardening agent and pulverized into a fine powder. The powdered modified resin can then be used as a binder for abrasive grains as described previously. The hot melt process is preferred because it provides for complete and rapid distribution of the thermoplastic polyarylene polyether in the heat-hardenable resin.

In the dry process, the powdered heat-hardenable resin can be tumbled, milled, blended, screw mixed or otherwise intimately commingled with pelleted, particulate or powdery thermoplastic polyarylene polyether. Dry mixes of thermoplastic polyarylene polyether and a heat hardenable resin together with a hardening agent can be made prior to or after pulverizing the mass for abrasive structure manufacture.

The abrasive compositions of this invention can be formed into a wide variety of abrasive structures and elements such as grinding wheels, snagging wheels, foundry wheels, cutoff wheels and discs, heavy duty sanding and finishing belts, and the like.

The following examples are intended to further illustrate the present invention without limiting the same in any manner. All parts and percentages are by weight unless indicated otherwise.

The abrasive compositions and structures in the examples and controls were prepared as follows: Liquid wetting agent at 25° C. is added to the abrasive grit in a metal pan and mixed with a spatula until each grain is wetted. A powdered binder is then passed through a sifter three times and deposited onto a piece of kraft paper. The binder was prepared by either the hot melt or the dry process detailed previously. The wetted grit is then dumped onto this dry powder mix coated by tumbling with a seesaw action of the kraft paper and scuffing with hands. Initial mix agglomeration is broken up by passing through a wide mesh screen. Kraft paper tumbling is continued until coating is complete and there is very little, if any, residual powdered resin. The ratio of powdered to liquid resin used is considered proper when the abrasive mix remains free flowing up to the time it is charged to the mold.

Six equal portions of the resultant mix are then each charged to a 6" x 1" x ½" mold cavity, leveled, and cold molded to a density of 47.5 grams/cubic inch (2.92 g./cc.) using 30 tons ram pressure. The abrasive test structures are then cured with a standard 24 hour stepwise cycle; 10 hours from 150° F. to 365° F., 12 hours hold at 365° F. and a 2 hour cooling period.

In all cases, three abrasive structures each were tested for flexural strength at 25° C. and 260° C. according to ASTM D–790–61. The average for the three structures was taken as the flexural strength.

Flexural modulus values and load-deformation data, where reported, were obtained from the flexural test curves where load was plotted against deformation.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:
$t_o$ is the efflux time of the pure solvent
$t_s$ is the efflux time of the polymer solution
$c$ is the concentration in terms of grams of polymer per 100 ml. of solution.

EXAMPLE 1

*Preparation of thermoplastic polyarylene polyether*

In a 250 ml. flask equipped with a stirrer, thermometer, a water cooled condenser and a Dean-Stark moisture trap filled with benzene, there were placed 11.42 grams of 2,2-bis-(4-hydroxyphenyl)propane (0.05 moles), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C., consisting of the dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° with good stirring for 4–5 hours. The viscous, orange solution was poured into 300 ml. water, rapidly circulating in a Waring Blendor, and the finely divided white polymer was filtered and then dried in a vacuum oven at 110° for 16 hours. The yield was 22.2 g. (100%) and the reaction was 99% complete based on a titration for residual base.

The polymer had the basic structure

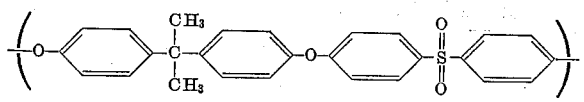

EXAMPLES 2–4

In these examples, dense abrasive structures, suitable for use in snagging wheel structures, were prepared as detailed supra. The composition was composed of the following ingredients:

| | Parts by weight |
|---|---|
| Abrasive grit [a] | 78.0 |
| Cryolite filler | 10.0 |
| Liquid resin [b] | 4.0 |
| Powdered resin [c] | 8.0 |

[a] Fused aluminum oxide ($Al_2O_3$) grit comprising a mixture of equal parts each of #12, #14, and #16 mesh size. The grit is sold under the name Aloxite by the Carborundum Co.
[b] A phenol-formaldehyde 1-step resole resin having a viscosity of 100–3000 cps. at 25° C.
[c] A phenol-formaldehyde 2-step novolak resin containing 9.1% by weight, based on the weight of the novolak resin, of hexamethylenetetramine hardener and 9.1% by weight, based on the weight of the novolak resin, of thermoplastic polyarylene polyether prepared as in Example 1 having a reduced viscosity of 0.49.

The control composition was the same as for the examples minus the thermoplastic polyarylene polyether. The structures were tested for flexural strength at room temperature (25° C.) and 260° C. Results are summarized below.

| Example No. | Molecular Weight of Novolak Resin | Binder Preparation Process | Flexural Strength, p.s.i. | | | |
|---|---|---|---|---|---|---|
| | | | Room Temp. (25° C.) | Percent Increase Over Control | 260° C. | Percent Increase Over Control |
| 2 | 590 | Hot melt | 4,400 | 26 | 2,600 | 37 |
| 3 | 590 | Dry | 4,100 | 17 | 2,600 | 37 |
| 4 | 490 | Hot melt | 5,000 | 43 | 2,200 | 16 |
| Control | 590 | | 3,500 | | 1,900 | |

The above data clearly demonstrates the greatly improved room temperature and elevated temperature flexural strengths of the abrasive compositions and structures of this invention, as compared to conventional structures and compositions such as the control. The improved room temperature strength of these examples is also indicative of their higher bursting speed (the speed at which a grinding wheel flies apart due to centrifugal force).

Data from the flexural test curves at 260° C. for the structure of Example 2 and the control are summarized below:

| Deformation, in. | Load, Pounds | |
|---|---|---|
| | Example 3 | Control |
| 0.005 | 30 | 20 |
| 0.010 | 55 | 35 |
| 0.015 | 75 | 47 |
| 0.020 | 90 | 58 |
| 0.024 | 98 | 63 |

The ability of the abrasive structure of this example to bear a far greater load than the conventional structure of the control and yet undergo the same amount of deformation as the control is indicative of the superior heat resistance, and hence the ability to absorb more severe punishment, of the structures and compositions of this invention.

The flexural test curves also indicated that the structure of Example 2 was capable of withstanding about three times the load of the control without undergoing permanent deformation.

EXAMPLES 5–11

In these examples, a commercially used snagging wheel screening composition was modified by adding to the novolak binder a thermoplastic polyarylene polyether. The binder was prepared by the hot melt process described above. The components of the composition were the same as in Examples 2–4 except that the amount of hardener in the binder was varied and the liquid resin was replaced by furfural solvent as the wetting agent.

The control composition was the same as for the examples minus the thermoplastic polyarylene polyether. The structures, which had a density of 2.82 g./cc., were tested for flexural strength at room temperature (25° C.) and at 260° C. Results are summarized below.

| Example No. | Molecular Weight of Novolac Resin | Percent Hexa-Methylene-Tetramine [1] | Percent Polyarylene Polyether [1] | Flexural Strength, p.s.i. | | | |
|---|---|---|---|---|---|---|---|
| | | | | Room Temp. (25° C.) | 260° C. | Percent Increase Over Control | Percent of Room Temp. Retained at 260° C. |
| 5 | 590 | 9.1 | 9.1 | 4,800 | 2,050 | 14 | 43 |
| 6 | 590 | 11.5 | 8.9 | 5,000 | 3,000 | 67 | 60 |
| 7 | 590 | 9.1 | 13.6 | 4,700 | 2,100 | 17 | 45 |
| 8 | 590 | 11.5 | 13.3 | 4,900 | 2,800 | 55 | 57 |
| 9 | 490 | 11.5 | 8.9 | 4,800 | 3,000 | 67 | 62 |
| 10 | 490 | 9.1 | 13.6 | 5,200 | 2,300 | 28 | 44 |
| 11 | 490 | 11.5 | 13.3 | 5,100 | 2,150 | 19 | 43 |
| Control | 590 | 9.1 | 0.0 | 4,600 | 1,800 | | 39 |

[1] By weight, based on the weight of the novolac resin.

Again, it has been demonstrated that the abrasive compositions and structures of this invention exhibit greatly improved room temperature and elevated temperature flexural strengths as compared to the conventional structure of the control. Moreover, the superior values for percent room temperature strength retained at 260° C., as compared to the control, indicate the high heat resistance and hence greater efficiency of the abrasive structures of this invention.

Data from the flexural test curves at 260° C. for the structures of Example 6 and the control are summarized below:

| Deformation, in. | Load, Pounds | |
|---|---|---|
| | Example 6 | Control |
| 0.005 | 35 | 10 |
| 0.010 | 67 | 23 |
| 0.015 | 90 | 30 |
| 0.020 | 105 | 38 |
| 0.025 | 110 | 45 |

Again, the superior heat resistance of the structures of this invention has been demonstrated by the ability of the structure of the example to bear a far greater load than the conventional structure of the control and yet undergo the same amount of deformation as the control. The flexural test curves again indicated that the structure of Example 6 was capable of withstanding about three times the load of the control without undergoing permanent deformation.

EXAMPLE 12

In this example, a second commercially used high heat resistant grinding wheel screening composition was modified by adding to the novolak binder a thermoplastic polyarylene polyether. The binder was prepared by the hot melt process described above. The components of the composition were the same as in Examples 2–4 except that the abrasive grit was 60 mesh sintered aluminum oxide and the liquid resin was replaced by furfural solvent as the wetting agent. The structures had a density of 2.71 g./cc.

The control composition was the same as for the examples minus the thermoplastic polyarylene polyether. Because the composition being tested was primarily intended for high heat use, the structures were tested at 290° C. Results are summarized below.

| Example No. | Molecular Weight of Novolak Resin | Percent Hexa-methylene-tetramine [1] | Percent Polyarylene Polyether [1] | Flexural Strength, p.s.i. | | |
|---|---|---|---|---|---|---|
| | | | | 290° C. | Percent Increase Over Control | Percent Room Temp. Strength Retained at 290° C. |
| 12 | 590 | 11.5 | 8.9 | 3,400 | 17 | 38 |
| Control | 590 | 9.1 | 0 | 2,900 | | 30 |

[1] By weight, based on the weight of the novolak resin.

This example demonstrates a significant improvement in flexural strength at 290° C. for the modified novolak composition of this invention as compared to the control, and, more importantly, exhibits superior heat resistance at the 290° C. test temperature.

EXAMPLE 13

In this example a commercially used foundry wheel screening composition was modified by adding to the novolak binder a thermoplastic polyarylene polyether. The binder was prepared by the hot melt process. The components of the composition were the same as in Examples 2–4.

The control composition was the same as for the example minus the thermoplastic polyarylene polyether. The abrasive structures were tested for flexural strength and flexural modulus at room temperature (25° C.). Results are summarized below.

| Example | Molecular Weight of Novolac Resin | Percent Hexa-methylene-tetramine [1] | Percent Polyarylene Polyether | Flexural Strength at Room Temp. (25° C.) | | Flexural modulus at room temperature (25° C.), p.s.i.×10⁻⁶ |
|---|---|---|---|---|---|---|
| | | | | P.s.i. | Percent Increase Over Control | |
| 13 | 490 | 6.5 | 9.4 | 4,100 | 20 | 2.3 |
| Control | 590 | 9.1 | 0 | 3,400 | | 2.4 |

[1] By weight, based on the weight of the novolac resin.

This example demonstrates a significant improvement in flexural strength at room temperature for the abrasive structures of this invention as compared to the conventional structure of the control.

EXAMPLE 14

Thermoplastic polyarylene polyethlene having the formula

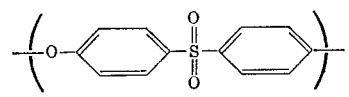

is prepared from 4,4'-dihydroxydiphenyl sulfone and 4,4'-dichlorodiphenyl sulfone according to the procedure in Example 1. This polymer is substituted for the polyarylene polyether of Example 3 and formed into an abrasive structure by the hot melt process described above. The abrasive structure is characterized by superior room temperature and elevated temperature flexural strengths and by improved heat resistance, indicated by deformation under load at 260° C., as compared to the control for Examples 2–4.

EXAMPLE 15

Thermoplastic polyarylene polyether having the formula:

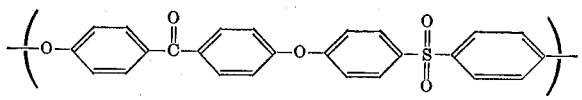

is prepared from the bisphenol of benzophenone and 4,4'-dichlorodiphenylsulfone according to the procedure in Example 1. This polymer is substituted for the polyarylene polyether of Example 2 and formed into an abrasive structure by the dry process described above. The abrasive structure is characterized by superior room temperature and elevated temperature flexural strengths and by improved heat resistance, indicated by deformation under load at 260° C., as compared to the control for Examples 5–11.

EXAMPLE 16

Thermoplastic polyarylene polyether having the formula

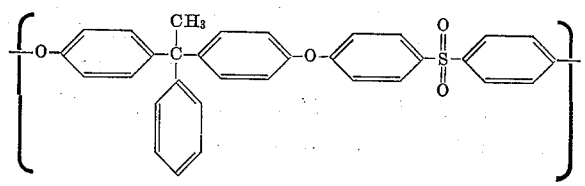

is prepared from the bisphenol of acetophenone and 4,4'-dichlorodiphenylsulfone according to the procedure in Example 1. This polymer is substituted for the polyarylene polyether of Example 2 and formed into an abrasive structure by the hot melt process described above. The abrasive structure is characterized by superior room temperature and elevated temperature flexural strengths and by improved heat resistance, indicated by deformation under load at 260° C., as compared to the control for Examples 5–11.

EXAMPLE 17

Thermoplastic polyarylene polyether having the formula

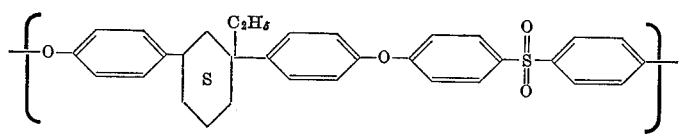

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure in Example 1. This polymer is substituted for the polyarylene polyether of Example 4 and formed into an abrasive structure by the dry process described above. The abrasive structure is characterized by superior room temperature and elevated temperature flexural strengths and by improved heat resistance, indicated by deformation under load at 260° C., as compared to the control for Examples 5–11.

EXAMPLE 18

Thermoplastic polyarlyene polyether having the formula

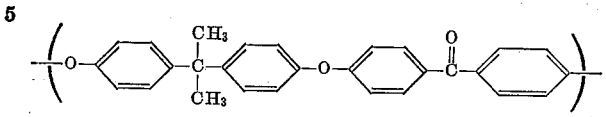

is prepared from 2,2'-bis-(4-hydroxyphenyl)propane and 4,4'-difluorobenzophenone according to the procedure in Example 1. This polymer is substituted for the polyarylene polyether of Example 2 and formed into an abrasive structure by the dry process described above. The abrasive structure is characterized by superior room temperature and elevated temperature flexural strengths and by improved heat resistance, indicated by deformation under load at 260° C., as compared to the control for Examples 5–11.

What is claimed is:

1. Abrasive composition comprising abrasive grains and a binding amount of a binder therefor comprising a heat hardenable resin and from about 1 to about 50 percent by weight, based on the weight of said resin, of a linear thermoplastic polyarylene polyether composed of recurring units having the formula

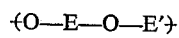

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

2. Composition defined in claim 1 where said polyarylene polyether is composed of recurring units having the formula

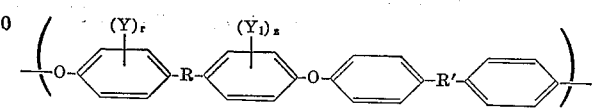

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represents inert substituent groups selected from the group consisting of halogen, alkyl groups having from 1 to 4 carbon atoms and alkoxy groups having from 1 to 4 carbon atoms and where $r$ and $z$ are integers having a value of from 0 to 4 inclusive.

3. Composition defined in claim 1 wherein said polyarylene polyether is composed of recurring units having the formula 4. Composition defined in claim 1 wherein said polyarylene polyether is composed of recurring units having the formula 5. Composition defined in claim 1 wherein said polyarylene polyether is present in an amount of from 5 to about 50 percent by weight.

6. Composition defined in claim 1 wherein said abrasive grains are aluminum oxide grains.

7. Composition defined in claim 1 which includes a heat resistant filler.

8. Abrasive structure molded from the composition of claim 1.

9. Abrasive structure molded from the composition of claim 2.

10. Abrasive structure molded from the composition of claim 3.

11. Abrasive composition comprising by weight, based on the weight of the composition, a major amount of abrasive grains and from about 1 to about 20 percent of a binder therefor comprising a heat hardenable resin and from about 1 to about 50 percent by weight, based on the weight of said resin, of a linear thermoplastic polyarylene polyether composed of recurring units having the formula

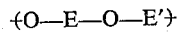

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

12. Composition defined in claim 11 wherein said polyarylene polyether is composed of recurring units having the formula

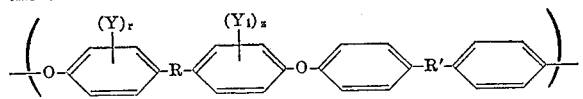

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

13. Composition defined in claim 11 wherein said polyarylene polyether is composed of recurring units having the formula

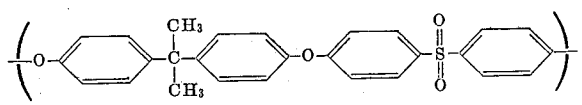

14. Composition defined in claim 11 wherein said polyarylene polyether is composed of recurring units having the formula

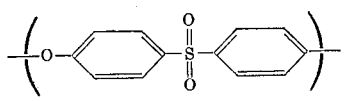

15. Composition defined in claim 11 which includes from about 5 to about 20 percent of a heat resistant filler.

16. Abrasive structure molded from the composition of claim 11.

17. Abrasive structure molded from the composition of claim 12.

18. Abrasive structure molded from the composition of claim 13.

References Cited

UNITED STATES PATENTS

| | | | |
|---|---|---|---|
| 3,177,090 | 4/1965 | Bayes et al. | 260—838 |
| 3,256,361 | 6/1966 | Harding et al. | 260—838 |
| 3,261,811 | 7/1966 | Tatum | 51—298 |
| 3,295,940 | 1/1967 | Geraw | 51—298 |
| 3,316,213 | 4/1967 | Berr | 51—298 |

ALEXANDER H. BRODMERKEL, *Primary Examiner.*

DONALD V. ARNOLD, *Examiner.*